United States Patent
Fernandez

Patent Number: 5,789,671
Date of Patent: Aug. 4, 1998

[54] AZIMUTH MISALIGNMENT DETERMINATION IN AN INERTIAL NAVIGATOR

[76] Inventor: Manuel Fernandez, 3422 Laurie Pl., Studio City, Calif. 91604

[21] Appl. No.: 698,395

[22] Filed: Aug. 15, 1996

[51] Int. Cl.⁶ .................... G01C 21/00; G01C 19/38
[52] U.S. Cl. .................................. 73/180; 33/324
[58] Field of Search .................. 73/180; 33/320, 33/321, 322, 323, 324, 325, 326, 317 D; 244/177; 364/450, 453, 454

[56] References Cited

U.S. PATENT DOCUMENTS

| | | | |
|---|---|---|---|
| 3,853,081 | 12/1974 | Daudelin et al. | 114/20 A |
| 3,938,256 | 2/1976 | Crocker, Jr. | 33/324 |
| 3,962,797 | 6/1976 | Galuschak | 33/324 |
| 4,303,978 | 12/1981 | Shaw et al. | 364/453 |
| 4,924,593 | 5/1990 | Renker et al. | 33/324 |

*Primary Examiner*—William L. Oen
*Attorney, Agent, or Firm*—Lyon & Lyon LLP

[57] ABSTRACT

A process and algorithms to determine and correct for the error in azimuth alignment and the errors in "North" and "East" Gyro Drift Rates in an inertial navigator which has been aligned via gyrocompassing, or via the "Stored Heading" technique, with the system "at rest". The process and algorithms may be implemented as an automatic sequence within the system computer to determine and correct the system errors thus determined. These actions make the inertial navigator more accurately represented by the model of an ideal navigation system with a pure and singular initial azimuth misalignment error. Thus the inertial navigator's inital azimuth misalignment error can be more accurately determined and corrected by the model.

20 Claims, 3 Drawing Sheets

AZIMUTH MISALIGNMENT DETERMINATION IN AN INERTIAL NAVIGATOR

BACKGROUND OF THE INVENTION

1. Field of the Invention

This invention relates in general to inertial navigators, and in particular to inertial navigators that self-align via gyrocompassing on the ground (system "at rest") prior to the start of the navigation function phase; and also to inertial navigators that are aligned in azimuth via the "Stored Heading" technique.

2. The Description of the Prior Art

It is well known by those skilled in the art, that inertial navigators that self-align via gyrocompassing on the ground (system "at rest") prior to the start of the navigation function phase, sustain an azimuth angular error predominately caused by "East" Gyro Drift Rate. Specifically, the azimuth misalignment error. $\psi_o$, is as follows:

$$\psi_o = \frac{DR_{GE}}{\Omega \cos Lt_o}$$

where $DR_{GE}$ is the "East" Gyro Drift Rate, $\Omega$ is the Earth's angular velocity in inertial space and $Lt_o$ is the Latitude at the gyrocompassing location.

For the following illustrative values:

$Lt_o = 45$ degrees $\cos Lt_o = 0.707$ $\Omega = 15$ degrees/hour=$7.27 \times 10^{-5}$ radians/second $DR_{GE} = 0.01$ degrees/hour=$4.8 \times 10^{-8}$ radians/second then we calculate $\psi_o = 0.054$ degrees=$0.943 \times 10^{-3}$ radians A pure and singular azimuth misalignment error of 0.054 degrees in an ideal navigation system would cause cross-axis errors in navigation. As an illustrative example, for an aircraft that traveled (after the start of the flight) 100 nautical miles (point-to-point distance) and has a ground speed of 450 knots, the cross-axis errors would be 0.094 nautical miles and 0.42 knots.

Note that we have utilized an error model of an ideal navigation system with only a pure and singular initial azimuth error. A major difference between the ideal navigation system and the inertial navigator is that the inertial navigator has numerous error sources besides the initial azimuth misalignment error that can contribute to navigational errors. For example, each of the error sources of "East" Gyro Drift Rate and "North" Gyro Drift Rate, each with a value of 0.01 degrees/hour, acting at the start of the navigation function phase, would each cause position errors of 0.4 nautical miles and velocity errors of 1.2 knots, 42 minutes (one-half a Shuler period) into the flight. These and other inertial navigator error sources thus interfere with the determination of the initial azimuth misalignment error utilizing the model of an ideal navigation system.

In the "Stored Heading" technique, the system can be aligned via gyrocompassing and the Heading of the vehicle Stored before the system is turned off. If the vehicle/system is not moved and the combination vehicle/system is stable in azimuth, the system can be assumed to be aligned accurately in azimuth, if the system is subsequently turned on and aligned in azimuth to the "Stored Heading" thus determined. Therefore, the situation is similar to that for gyrocompassing alignment with the added uncertainty due to the vehicle/system stability in azimuth.

In the prior art, others have tried to determine the initial azimuth misalignment of the system after the start of the flight by utilizing external navigational aids and the model of the ideal navigation system with a pure and singular azimuth misalignment error.

Another technique tried is to maneuver the vehicle so as to change the velocity vector (primarily in direction) to determine the azimuth misalignment utilizing the model of an ideal navigation system with a pure and singular azimuth misalignment error. The rationale is that if velocity and position errors are made zero at the start of the maneuver, the inertial navigator with only an azimuth misalignment error, will experience cross-axis position and velocity errors at the end of the maneuvar which are a function of the azimuth misalignment during the maneuver.

A currently popular technique is to utilize external navigation aids (such as the Global Positioning System) and an optimal estimation filter to correct the system during flight. However, this technique suffers from the fact that the resulting solution yields an azimuth misalignment error that is a function of residual "East" Gyro Drift Rate. In other words, it is not possible to distinguish between azimuth misalignment and "East" Gyro Drift Rate when aligning in azimuth via gyrocompassing.

All of the above prior techniques are inadequate for determining azimuth misalignment error accurately because the inertial navigator has error sources that interfere with the accurate determination of the azimuth misalignment error. The present invention was discovered in the course of trying to improve the adequacy of prior techniques as enumerated above to determine azimuth misalignment. The path of discovery was to contemplate the exact error equations of the system and the possible error sources in the system that could render inadequate results. It was during this investigation, that the present invention was discovered. As it turned out, the desired result was acheived with a simple process and simple algorithms embodied in the present invention. The process and algorithms of the present invention may be implemented as an automatic sequence within the system computer to correct the system.

SUMMARY OF THE INVENTION

An object of this invention is to provide a means to determine and correct for errors in alignment and initialization in an inertial navigator that has been aligned via gyrocompassing, or via the "Stored Heading" technique, with the system "at rest". In order to correct for gyrocompassing error, or "Stored Heading" error, the system is placed in the (unaided) navigate mode after the alignment and initialization is complete and the system "North" Velocity error, $\Delta V_{NS}$ is monitored for a short period of time, T. A correction to "East" Gyro Drift Rate, $\Delta DR_{GE}$, is required as follows:

$$\Delta DR_{GE} = \frac{2 \Delta V_{NS}}{G T^2}$$

where G is the value of Gravity (approximately 32.2 feet/second$^2$).

During the same period T, the system "East" Velocity error, $\Delta V_{ES}$, is monitored. A correction to "North" Gyro Drift Rate, $\Delta DR_{GN}$, is required as follows:

$$\Delta DR_{GN} = \frac{2 \Delta V_{ES}}{G T^2}$$

The above algorithms are approximations to the more general algorithms where T is small relative to the Shuler period (equal to $$2\pi \sqrt{\frac{R_{EO}}{G}} = 84 \text{ minutes}$$

The more general algorithms are as follows:

$$\Delta DR_{GE} = \frac{\Delta V_{NS}}{R_{EO} \left( 1 - \cos \sqrt{\frac{G}{R_{EO}}} t \right)}$$

$$\Delta DR_{GN} = \frac{\Delta V_{ES}}{R_{EO} \left( 1 - \cos \sqrt{\frac{G}{R_{EO}}} t \right)}$$

The approximations where arrived at by making the following substitutions:

$$\cos \sqrt{\frac{G}{R_{EO}}} \, t = 1 - \frac{G t^2}{2 R_{EO}} + \ldots$$

$$t = T$$

The more general algorithms are to be used when the t chosen is not small enough to make the approximations accurate enough for the intended purpose of determining $\Delta DR_{GE}$ and $\Delta DR_{GN}$. The corrections to $\Delta DR_{GE}$ and $\Delta DR_{GN}$ are opposite in sign to gyro drift rates that would cause the monitored $\Delta V_{NS}$ and $\Delta V_{ES}$ errors, respectively.

With these two corrections made in the system, together with corrections for $\Delta V_{NS}$ and $\Delta V_{ES}$, the system can continue to navigate accurately. In essence the system now better meets (with the corrections made), the seven conditions that are required for an accurate alignment and initialization. Further, we have insured that the "East" and "North" gyro drift rates are zero.

If desired, the position errors may be monitored, rather than the velocity errors, and the following algorithms may then be utilized to determine $\Delta DR_{GE}$ and $\Delta DR_{GN}$:

$$\Delta DR_{GE} = \frac{6 \Delta Lt}{G T^3}$$

$$\Delta DR_{GN} = \frac{-6 \Delta Lg}{G T^3}$$

Where ΔLg is the error in Longitude—West.

The above are approximations for small values of time relative to the Shuler (84-minute) period. The more general algorithms are as follows:

$$\Delta DR_{GE} = \frac{\Delta Lt}{R_{EO} \left( t - \sqrt{\frac{R_{EO}}{G}} \sin \sqrt{\frac{G}{R_{EO}}} t \right)}$$

$$\Delta DR_{GN} = \frac{-\Delta Lg}{R_{EO} \left( t - \sqrt{\frac{R_{EO}}{G}} \sin \sqrt{\frac{G}{R_{EO}}} t \right)}$$

The approximations have been arrived at by substituting the following:

$$\sin x = x - \frac{x^3}{6} + \ldots$$

$$t = T$$

The velocity errors at time T, or the position errors at time T, or both, may be utilized to determine $\Delta DR_{GE}$ and $\Delta DR_{GN}$. Those skilled in the art can decide whether to monitor the velocity errors or the position errors, or both, what time period T to use, which algorithms to use to determine $\Delta DR_{GE}$ and $\Delta DR_{GN}$, depending on the implementation of their particular inertial navigator.

The seven conditions that are required for an accurate alignment and initialization are as follows:

1. The "level" axes of the system are level, except for small errors caused by the "level" accelerometer bias errors.

2. The "level axes" rates are essentially zero when referenced to the vertical.
   A rate about the system North" "level axis" causes the $\Delta V_{ES}$ error discussed above.
   A rate about the system "East" "level axis" causes the $\Delta V_{NS}$ error discussed above.

3. The azimuth misalignment, $\psi_o$, is a function of "East" Gyro Drift Rate, $DR_{GE}$. That is, $\psi_o \, \Omega \cos Lt_o - DR_{GE} = 0$ which would mean that the "East" "level axis" rate is zero. If $\psi_o \, \Omega \cos Lt_o - DR_{GE} = 0$, then there is a rate about the system "East" "level axis" which causes the $\Delta V_{NS}$ error discussed above.

4. The azimuth axis rate is zero, when referenced to North. A small value of azimuth-axis drift rate, $\Delta DR_{GD}$ does not interfere with the determination of $\Delta DR_{GE}$ (nor, $\Delta DR_{GN}$). The term $\Delta DR_{GD}$ denotes the "Down" Gyro Drift Rate. For equal values of $\Delta DR_{GD}$ and $\Delta DR_{GE}$ (or $\Delta DR_{GN}$), the resulting $\Delta V$'s for individual error sources ($\Delta DR_{GD}$ versus $\Delta DR_{GE}$ (or $\Delta DR_{GN}$)) have a ratio of approximating $1/200$ for T=300 seconds and cos Lt=0.707. That is, the $\Delta V$ due to $\Delta DR_{ED}$ is approximately 200 times less than the $\Delta V$ due to $\Delta DR_{GE}$ (or $\Delta DR_{GN}$).

5. North and East system velocities with respect to the Earth's surface have zero errors.

6. The system Latitude and Longitude positon coordinates have zero errors.

7. The system quantities $R_{EO}$ and $R_{EO}$ have zero errors. $R_{EO}$ is the distance from the center of the Earth to the location of the system (approximately $2 \times 10^7$ feet) and $R_{EO}$ is the (first) derivative of $R_{EO}$ with respect to time).

It should be noted that the inertial navigator "at rest" should have no major error forcing functions if the above seven conditions are met, and if the accelerometer biases and gyro drift rates are stable before and during the time T. It should be noted that the process and algorithms of the present invention may be implemented as an automatic sequence within the system computer to determine and correct the four errors thus determined.

The result of determining and correcting for the four errors cited above results in more accurate velocity and positional data during the inertial navigator's (unaided) navigation function phase. By better ensuring that the inertial navigator has met the seven conditions that are required for an accurate alignment and initialization, the inertial navigator is better represented by the ideal navigation system model with a pure and singular azimuth misalignment error. Clearly there are other error sources that are effective as movement begins; however, these are of lessor order.

The above actions overcome the shortcomings of prior techniques that are inadequate in acheiving the determination and correction of the initial azimuth misalignment error, $\psi_o$.

External navigational aid fix(es) may be utilized to determine the cross-axis errors in position and/or velocity. Either, or both, of the cross-axis errors may be utilized to determine the initial azimuth misalignment, $\psi_o$, depending on the accuary of the fixes.

DETAILED DESCRIPTION

The present invention presents a process and algorithms that corrects errors in the inertial navigator that cause it to navigate more accurately, except for the initial azimuth misalignment error, $\psi_o$. Thereby, the inertial navigator can more adequately be represented by the ideal navigation system model with a pure and singular azimuth misalignment error, $\psi_o$. These actions make the determination of the initial azimuth misalignment error, $\psi_o$, more accurate using the model.

The starting point of the process is the alignment (and initialization) of the system via gyrocompassing or via the "Stored Heading" technique with the system on the ground and "at rest". Initialization and alignment signifies meeting the seven conditions discussed above. The system is now switched to the (unaided) navigation function mode and the error buildups of $\Delta V_{NS}$ and $\Delta V_{ES}$ are monitored for a short time T. The system then is corrected for these $\Delta V_{NS}$ and $\Delta V_{ES}$ errors and also for $$\Delta DR_{GE} = \frac{2 \Delta V_{NS}}{G T^2}$$

$$\Delta DR_{GN} = \frac{2 \Delta V_{ES}}{G T^2}$$

while the system is still "at rest".

If felt necessary, the angular errors caused by $\Delta DR_{GE}$ and $\Delta DR_{GN}$ during the time period T may be corrected.

The angular errors are as follows:

$$\Delta \theta = \Delta DR_{GN} \sqrt{\frac{R_{EO}}{G}} \sin \sqrt{\frac{G}{R_{EO}}} t$$

$$\Delta \phi = \Delta DR_{GE} \sqrt{\frac{R_{EO}}{G}} \sin \sqrt{\frac{G}{R_{EO}}} t$$

Figure 1:
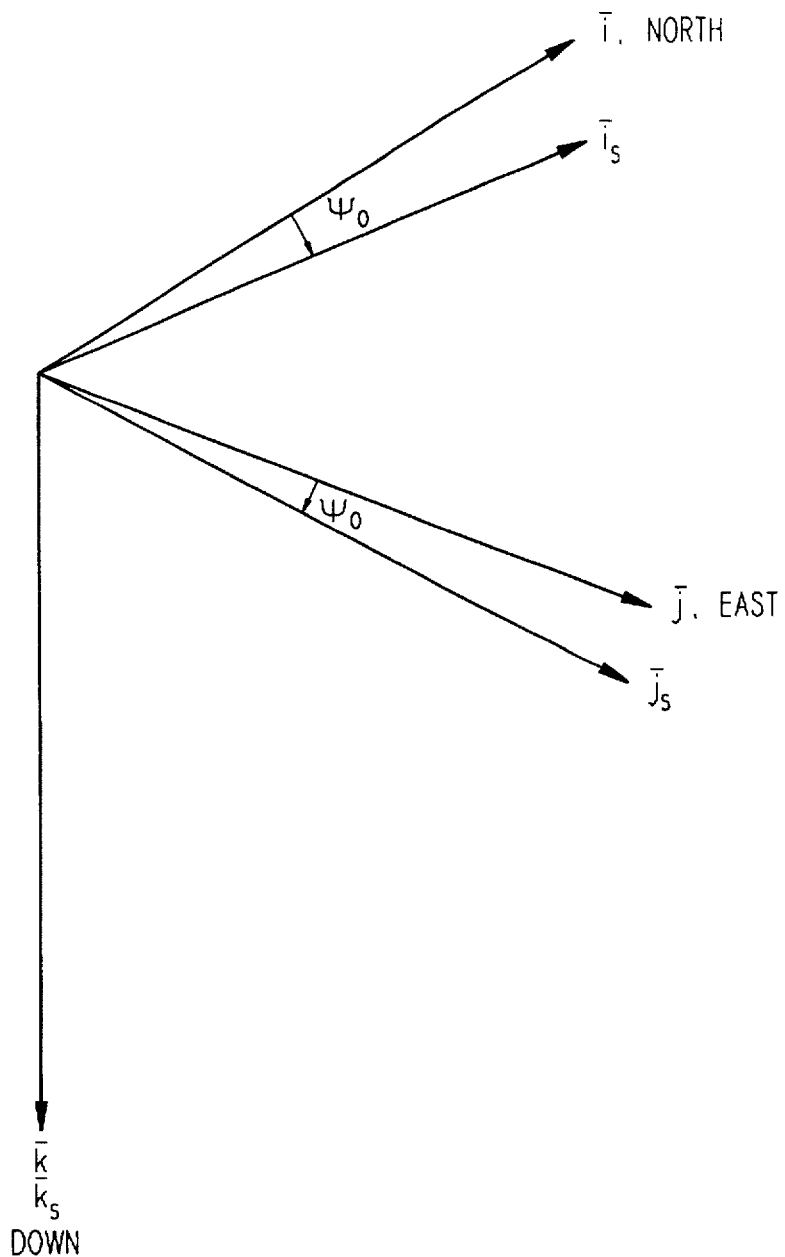
FIG. 1 shows the correct geographical orthogonal coordinate axes $\bar{i}, \bar{j}, \bar{k}$ with $\bar{i}$ North, $\bar{j}$ East and $\bar{k}$ Down; and the misaligned system orthogonal coordinate axes $\bar{i}_s, \bar{j}_s, \bar{k}_s$ separated by a pure and singular initial azimuth misalignment error $\psi_o. \psi_o$ is a rotation about the $\bar{k}_s$ axis.
Figure 2:
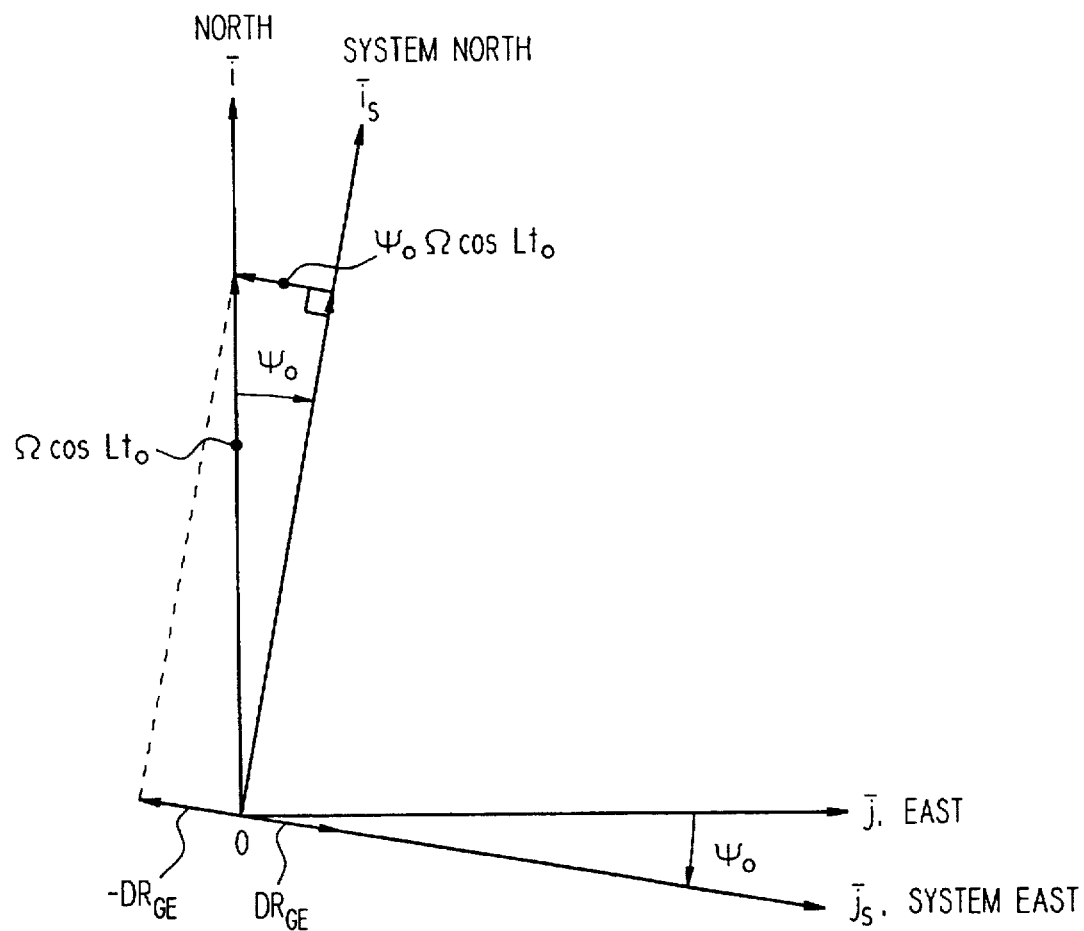
FIG. 2 is the ideal situation at the end of gyrocompassing or "Stored Heading" alignment with $\psi_o \Omega \cos Lt_o - DR_{GE} = 0$ If $\psi_o \Omega \cos Lt_o - DR_{GE} = 0$, then the alignment was not accomplished accurately. A value of $\Delta V_{NS}$ over a time period T in the (unaided) navigate mode denotes that azimuth alignment was not accomplished accurately. The sign of $\Delta V_{NS}$ denotes the opposite sign of the $\Delta DR_{GE}$ correction required about the $\bar{j}_s$ axis.

Also if felt necessary, the position errors caused by $\Delta DR_{GE}$ and $\Delta DR_{EN}$ during the time period T may be corrected. The position errors may be corrected by resetting the Latitude and Longitude of the gyrocompassing location. If the system had been aligned accurately, the system would have had an initial azimuth alignment error, $\psi_o$, as indicated in FIG. 1. Referring now to FIG. 2 this azimuth misalignment error, $\psi_o$, would have been caused by an "East Gyro Drift Rate, $DR_{GE}$, such that $\psi_o \Omega \cos Lt_o - DR_{GE} = 0$ In general, the alignment and initialization of the system would have not been perfectly accurate and we test for this by monitoring $\Delta V_{NS}$ and $\Delta V_{ES}$ over a period of time T as discussed above.

After the time T and after the above corrections to the system are made, the system continues to navigate accurately in the (unaided) navigation function mode. After this, system movement may commence and the system continues in the (unaided) navigation function mode.

Figure 3:
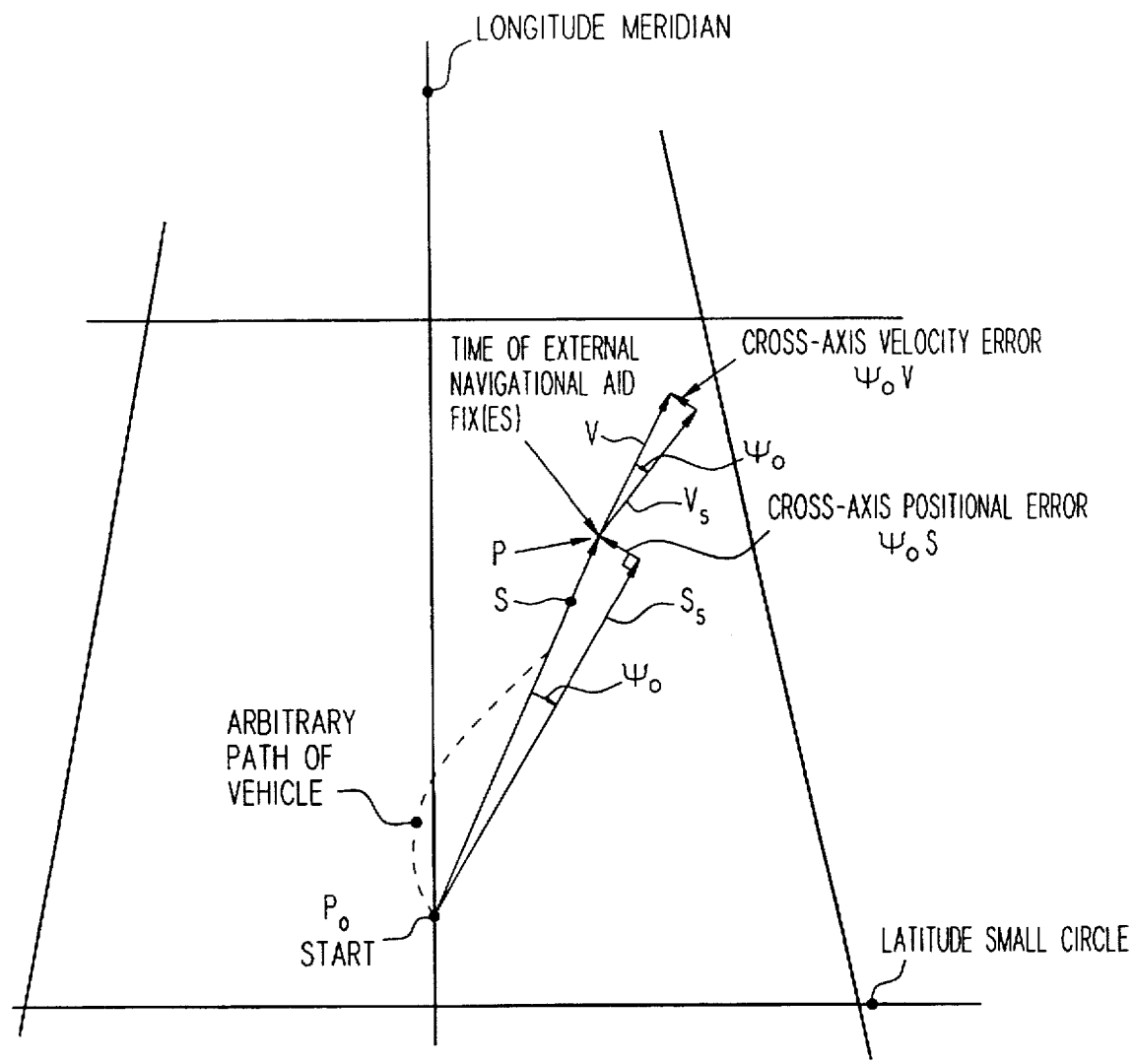
FIG. 3 shows the model of an ideal navigation system with a pure and singular initial azimuth error, $\psi_o$. After a time of flight, having traveled a distance S (point-to-point) from the start at position $P_o$, the system is at position P, and has a velocity V. The system indicates it has traveled a distance $S_S$ and acheived a velocity $V_S$.

Assuming this is an aircraft inertial navigator for purposes of illustration, the next part of the process is when the aircraft has traveled a point-to-point distance S (say 100 Nautical miles, more or less) and achieved a velocity V (say 450 knots, more or less), see FIG. 3.

At this point, external navigational aid fix(es) of position and/or velocity are taken and either or both of the system cross-axis positon and velocity errors are calculated. From these cross-axis errors, the initial azimuth misalignment error, $\psi_o$, of the system may be calculated as follows:

$$\psi_o = \frac{\text{Cross-Axis Velocity Error}}{V}$$

$$\psi_o = \frac{\text{Cross-Axis Position Error}}{S}$$

where V is the velocity, given by the fix and S is the point-to-point distance the aircraft has traveled since the start of the flight as given by the positional fix at point P, see FIG. 3. At this point, the system is to be corrected for the initial azimuth misalignment error, $\psi_o$, and the $DR_{GE}$ which caused the $\psi_o$:

$DR_{GE} = \psi_o \Omega \cos Lt_o$ and for the cross-axis velocity and position errors from the fixes. Note that if only external navigational aid position fixes are available to the accuracy necessary, then the cross-axis velocity error may be calculated from Cross-Axis velocity Error$\equiv \psi_o V_s$. If only external navigation aid velocity errors are available to the accuracy necessary to determine $\psi_o$ accurately, then the cross-axis position error can be calculated as follows:

Cross-Axis Position Error$\equiv \psi_o S_s$

Alternately, instead of correcting the system for just the cross-axis position and velocity errors, the system may be corrected for the values obtained by the navigational aid fixes, assuming they are of sufficient accuracy. After the above corrections are made, the process is complete and the system will continue to navigate accurately, now being devoid of the initial azimuth misalignment error, which is the object of the present invention.

It should be noted that the process and algorithms utilized to determine $\Delta DR_{GN}$ and $\Delta DR_{GE}$ on the ground are tests to ensure that $\dot\theta$ and $\dot\phi$, respectively, are zero. This is important because if the system is to perform as an ideal navigation system with only a pure and singular azimuth misalignment error, $\theta$, $\dot\theta$, $\phi$ and $\dot\phi$ must be zero. Then the Shuler-tuned system will continue in this state with the following conditions during take-off and subsequent early flight:

$\theta=\dot\theta=0$ $\phi=\dot\phi=0$ $\dot\psi\cong 0$ ( a small rate may exist because of the weak coupling with $\theta$ and $\phi$)

$$\psi_o = \frac{DR_{GE}}{\Omega \cos Lt_o}$$

Later, $\psi_o$ when is determined and corrected, the inputs to the level-axes gyros must be corrected so that $\theta$ and $\phi$ continue to be zero. The inputs to the level-axes gyros should be as follows and the corrections required should be as follows when $\psi_o$ and $\Delta DR_{GE}$ are corrected:

"North" Gyro Input: $\left\{ \Omega \cos Lt + \dfrac{V_E}{R_{EO}} \right\}$

Correction Required: $\left\{ \dfrac{V_N}{R_{EO}} \psi_o \right\}$

"East" Gyro Input: $-\dfrac{V_N}{R_{EO}}$

Correction Required: None

Note that those skilled in the art can make the coordinate transformation between Latitude and Longitude coordinate positional errors and cross-axis positional error and between North and East velocity errors and cross-axis velocity error, and vice versa.

It should be noted that the process and algorithms may be implemented as an automatic sequence within the system computer to determine and correct $\psi_o$, $DR_{GE}$ and the positional and velocity cross-axis errors caused by $\psi_o$.

While the above discovery appears rather straight forward, it has escaped all investigators to date. Key elements of the present invention are as follows:

Significant system errors are determined and corrected while the system is "at rest" in the (unaided) navigate function mode (the system having just been aligned and initialized and switched to the navigate function mode).

The system has been corrected for significant system errors while "at rest" so that the system more adequately meets the model of an ideal navigation system with a pure and singular azimuth misalignment error.

The model of the ideal navigation system with a pure and singular azimuth misalignment error is utilized together with external navigational fix(es) to correct the system for initial azimuth misalignment, the "East" Gyro Drift Rate that caused the initial azimuth misalignment and the system positional and velocity cross-axis errors caused by the initial azimuth misalignment error, $\psi_o$.

At the end of the process, the system is devoid of the initial azimuth misalignment error, $\psi_o$, the "East Gyro Drift Rate that caused the initial azimuth misalignment, and has been corrected for the positional and velocity cross-axis errors caused by the initial azimuth misalignment error, $\psi_o$. Corrections are made to the system inputs to the level-axes gyros in order to maintain $\theta$ and $\phi$ equal to zero as the above corrections to the system are made.

We now make some assumptions (for illustrative purposes) of how the values of the key variables stack up. For the following values:

$\Omega=15$ degrees/hour=$7.27\times 10^{-5}$ radians/second
$Lt_o=45$ degrees
$\cos Lt_o=0.707$
$\Delta DR_{GE}=0.01$ degrees/hour=$4.8\times 10^{-8}$ radians/second
We obtain $\psi_o=0.054$ degrees=$0.943\times 10^{-3}$ radians For T=100 seconds, we obtain $\Delta V_{NS}=\tfrac{1}{2}$ G $\Delta DR_{GE}T^2=0.77\times 10^{-2}$ feet/second If we also assume $\Delta DR_{GN}$ 0.01 degrees/hour=$4.8\times 10^{-8}$ radians/second, then $\Delta V_{ES}=\tfrac{1}{2}$ G $\Delta DR_{GN}$ $T^2=0.77\times 10^{-2}$ feet/second Therefore, we arrive at the following table to show how the variables stack up for $Lt_o=45$ degrees.

| $\Delta DR_{GE}$ or $\Delta DR_{GN}$ degrees/hour | $\Delta \psi_o$ for $\Delta DR_{GE}$ degrees | T seconds | $\Delta V_{NS}$ for $\Delta DR_{GE}$ or $\Delta V_{ES}$ for $\Delta DR_{GN}$ feet/second ($\times 10^{-2}$) |
|---|---|---|---|
| 0.005 | 0.027 | 50 | 0.097 |
| 0.005 | 0.027 | 100 | 0.39 |
| 0.005 | 0.027 | 200 | 1.55 |
| 0.005 | 0.027 | 300 | 3.48 |
| 0.01 | 0.054 | 50 | 0.193 |
| 0.01 | 0.054 | 100 | 0.77 |
| 0.01 | 0.054 | 200 | 3.09 |
| 0.01 | 0.054 | 300 | 6.96 |
| 0.02 | 0.108 | 50 | 0.39 |
| 0.02 | 0.108 | 100 | 1.55 |
| 0.02 | 0.108 | 200 | 6.18 |
| 0.02 | 0.108 | 300 | 13.91 |

Those skilled in the art can select the appropriate T and the appropriate least significant value for counting $\Delta V$ during the period T to implement the process and algorithms, depending, for example, on the grade of gyros utilized in implementing their particular inertial navigator. Those skilled in the art can incorporate the present invention into the particular implementation of their inertial navigator.

The process and algorithms of the present invention apply to gimballed and strapdown systems; and to local vertical, local north and all other analytic systems, such as geocentric vertical, space-stabilized azimuth analytic systems. Also, the process and algorithms of the present invention apply to optimal estimation filters wherein their implementation acheives the intended purpose by incorporation of the process and algorithms into the filter's system model.

I claim:

1. A method for correcting an initial azimuth alignment error in an inertial navigator which has been pre-aligned in azimuth with an azimuthal alignment proportional to east gyro drift, said inertial navigator comprising at least an east gyro and a north gyro, said method comprising the steps of:

placing the inertial navigator in an unaided navigation mode;

measuring a cumulative north velocity error in a detected north velocity while the inertial navigator is at rest;

measuring a cumulative east velocity error in a detected east velocity while the inertial navigator is at rest;

determining a drift rate about an east axis using the cumulative north velocity error;

determining a drift rate about a north axis using the cumulative east velocity error;

correcting the inertial navigator for the drift rate about a east axis and the drift rate about the north axis;

correcting the inertial navigator for the cumulative north velocity error and the cumulative east velocity error;

determining a cross-axis error in navigational data output by the inertial navigator after the inertial navigator has traveled from an original location to a new location, said cross-axis error caused at least in part by an initial azimuth misalignment;

correcting the inertial navigator for the cross-axis error; and correcting the inertial navigator for an initial azimuth misalignment and an east gyro drift rate that caused the initial azimuth misalignment.

2. The invention of claim 1, wherein said step of measuring the cumulative north velocity error comprises the step of detecting a north velocity over a predetermined time interval T, and wherein said step of measuring the cumulative east velocity error comprises the step of detecting an east velocity error over said predetermined time interval T.

3. The invention of claim 2 wherein said step of determining a drift rate about the east axis using the cumulative north velocity error is accomplished according to the formula $$\Delta DR_{GE} = \frac{2 \cdot \Delta V_{NS}}{G \cdot T^2},$$

wherein $\Delta DR_{GE}$ represents the drift rate about the east axis, $\Delta V_{NS}$ represents the cumulative north velocity error, G represents a gravitational constant, and T represents said predetermined time interval; and wherein said step of determining a drift rate about the north axis using the cumulative east velocity error is accomplished according to the formula $$\Delta DR_{GN} = \frac{2 \cdot \Delta V_{ES}}{G \cdot T^2},$$

wherein $\Delta DR_{GN}$ represents the drift rate about the north axis, $\Delta V_{ES}$ represents the cumulative east velocity error, G represents said gravitational constant, and T represents said predetermined time interval.

4. The invention of claim 2 further comprising the steps of correcting the inertial navigator for angular errors caused by the drift rate about the east axis and the drift rate about the north axis, and correcting the inertial navigator for position errors caused by the drift rate about the east axis and the drift rate about the north axis.

5. The invention of claim 1 wherein said step of correcting the inertial navigator for the drift rate about the east axis and the drift rate about the north axis is carried out using an automatic sequence within a system computer.

6. The method of claim 1 wherein the step of determining a cross-axis error in navigational data output by the inertial navigator after the inertial navigator has traveled from an original location to a new location comprises the step of comparing the navigational data output by the inertial navigator with a reference position provided by at least one external navigational aid.

7. The method of claim 6 wherein said at least one external navigational aid comprises a global positioning system (GPS).

8. The method of claim 6 wherein said step of determining a cross-axis error in navigational data output by the inertial navigator after the inertial navigator has traveled from an original location to a new location comprises the step of determining at least one of a cross-axis positional error and a cross-axis velocity error, and wherein the step of correcting the inertial navigator for the cross-axis error comprises the step of determining the initial azimuth misalignment according to the formula $$\Psi_0 = \frac{V_{ERROR}}{V},$$

for the cross-axis velocity error, or $$\Psi_0 = \frac{X_{ERROR}}{S},$$

for the cross-axis position error, wherein $\Psi_o$ represents the initial azimuth misalignment error, $V_{ERROR}$ represents the cross-axis velocity error, $X_{ERROR}$ represents the cross-axis position error, S represents a point-to-point distance between the original location and the new location determined with assistance of the external navigation aid, and V represents actual velocity as determined with assistance of the external navigation aid.

9. The method of claim 8 wherein said step of determining at least one of a cross-axis positional error and a cross-axis velocity error is carried out using an automatic sequence within a system computer.

10. The method of claim 1 wherein the east gyro drift rate is determined according to the formula $$DR_{GE} = \Psi_o \cdot \Omega \cdot \cos Lt_o,$$

wherein $DR_{GE}$ represents the east gyro drift rate, $\Psi_o$ represents the initial azimuth misalignment, $\Omega$ represents an angular velocity of the earth in inertial space, and $Lt_o$ represents the latitude at the self-alignment location.

11. The method of claim 10 wherein the east gyro drift rate is determined using an automatic sequence within a computer system.

12. The method of claim 1 wherein the inertial navigator is pre-aligned in azimuth using a gyrocompassing technique or a stored heading technique.

13. In a system using an inertial navigator which has been self-aligned in azimuth and then placed in an unaided navigation mode, a method for correcting an initial azimuth alignment error comprising the steps of:

measuring a cumulative north velocity error with the inertial navigator at rest;

calculating a drift rate about an east axis from the cumulative north velocity error;

measuring a cumulative east velocity error with the inertial navigator at rest;

calculating a drift rate about a north axis from the cumulative east velocity error;

correcting the inertial navigator for the drift rate about the east axis;

correcting the inertial navigator for the drift rate about the north axis;

correcting the inertial navigator for the cumulative north velocity error and the cumulative east velocity error; and correcting the inertial navigator for position errors caused by the drift rate about the north axis and the drift rate about the east axis.

14. The system of claim 13, further comprising the steps of:

traveling with the inertial navigator from a first position to a second position;

determining a reference position and a reference velocity using an external navigation aid;

comparing the reference position with a current position as indicated by the inertial navigator;

comparing the reference velocity with a current velocity as indicated by the inertial navigator;

deriving a cross-axis position error and a cross-axis velocity error based on the difference between the reference position and the current position as indicated by the inertial navigator and the difference between the reference velocity and the current velocity as indicated by the inertial navigator;

calculating an initial azimuth misalignment based upon at least one of said cross-axis position error and said cross-axis velocity error;

calculating an east gyro drift rate from said initial azimuth misalignment;

correcting the inertial navigator for said cross-axis position error, said cross-axis velocity error, said initial azimuth misalignment, and said east gyro drift rate.

15. The system of claim 14 wherein the east gyro drift rate is determined according to the formula $$DR_{GE} = \psi_o \cdot \Omega \cdot \cos Lt_o,$$

wherein $DR_{GE}$ represents the east gyro drift rate, $\psi_o$ represents the initial azimuth misalignment, $\Omega$ represents an angular velocity of the earth in inertial space, and $Lt_o$ represents the latitude at the self-alignment location.

16. The system of claim 13, wherein said step of calculating the drift rate about the east axis from the cumulative north velocity error comprises the step of dividing twice the cumulative north velocity error by a product of a gravitational constant and a square of an amount of time over which the cumulative north velocity error was measured, and wherein said step of calculating the drift rate about the north axis from the cumulative east velocity error comprises the step of dividing twice the cumulative east velocity error by a product of the gravitational constant and a square of an amount of time over which the cumulative east velocity error was measured.

17. The system of claim 14 wherein one or more of said steps of correcting the inertial navigator are carried out using an automatic sequence within a system computer.

18. The system of claim 13 wherein said inertial navigator is pre-aligned using a gyrocompassing or a stored heading technique.

19. An inertial navigator, comprising:

a plurality of gyros;

first velocity measuring means for measuring a north velocity, wherein a north direction is determined according to said plurality of gyros during self-alignment with the system at rest;

second velocity measuring means for measuring an east velocity, wherein an east direction is determined according to said plurality of gyros during self-alignment with the system at rest;

a north velocity error measurement accumulator connected to said first velocity measuring means, said north velocity error measurement accumulator outputting a cumulative north velocity error measurement;

an east velocity error measurement accumulator connected to said second velocity measuring means, said east velocity error measurement accumulator outputting a cumulative east velocity error measurement;

an east axis drift rate calculator coupled to said north velocity error measurement accumulator, said east axis drift rate calculator outputting an east axis drift rate value from said cumulative north velocity error measurement;

a north axis drift rate calculator coupled to said east velocity error measurement accumulator, said north axis drift rate calculator outputting a north axis drift rate value from said cumulative east velocity error measurement; and a compensator connected to said east axis drift rate calculator and to said north axis drift rate calculator, said compensator correcting the inertial navigator according to said east axis drift rate value and said north axis drift rate value, for said cumulative north velocity error measurement and said cumulative east velocity error measurement, and for angular and position errors indicated by the north axis drift rate value and the east axis drift rate value.

20. The inertial navigator of claim 19, further comprising:

means for receiving navigational data from an external navigation aid;

a cross-axis position error calculator, said cross-axis position error calculator outputting a cross-axis position error based upon a comparison of said navigation data, from the external navigational aid and a navigational position as indicated by said inertial navigator;

a cross-axis velocity error calculator, said cross-axis position error calculator outputting a cross-axis velocity error based upon a comparison of said navigational data from the external navigation aid and a velocity as indicated by said inertial navigator;

a initial azimuth misalignment calculator, said initial azimuth misalignment calculator outputting an initial azimuth misalignment error value based upon at least one of said cross-axis position error and said cross-axis velocity error; and an east gyro drift rate calculator, said east gyro drift rate calculator outputting an east gyro drift rate value based upon said initial azimuth misalignment error value;

wherein said compensator corrects the inertial navigator for said initial azimuth misalignment error, said cross-axis velocity error, said cross-axis position error, and said east gyro drift rate.

* * * * *

UNITED STATES PATENT AND TRADEMARK OFFICE
CERTIFICATE OF CORRECTION

PATENT NO. : 5,789,671
DATED : August 4, 1998
INVENTOR(S) : Manuel Fernandez Page 1 of 2

It is certified that error appears in the above-identified patent and that said Letters Patent is hereby corrected as shown below:

At col. 4, line 11 the term "$\Delta DR_{Gn}$" should read --$\Delta DR_{GN}$--

At col. 4, line 28 after "$DR_{GE}$" the symbol "=" should read --$\neq$--

At col. 4, line 39 after "due to" the term "$\Delta DR_{ED}$" should read --$\Delta DR_{GD}$--

At col. 4, line 47 the term "and $R_{EO}$" should read --and $\dot{R}_{EO}$--

At col. 4, line 50 before "is the" the term "$R_{EO}$" should read --$\dot{R}_{EO}$--

At col. 5, line 6 before the Brief Description of the Drawings, the following paragraph should be inserted:

--Note that the present invention makes the "Stored Heading" azimuth alignment technique capable of accurate navigation. Instead of spending time gyrocompassing, the "Stored Heading" technique may be used and the time saved used to correct the system, as indicated. The total time required on the ground for the "Stored Heading" alignment and for the process presented (T) should be approximately 6 minutes, more or less.--

UNITED STATES PATENT AND TRADEMARK OFFICE
CERTIFICATE OF CORRECTION

PATENT NO. : 5,789,671
DATED : August 4, 1998
INVENTOR(S) : Manuel Fernandez

It is certified that error appears in the above-identified patent and that said Letters Patent is hereby corrected as shown below:

At col. 5, line 16 the term "$\overline{k}_s$" should read -- $\overline{k}_s$ --

At col. 5, line 32 the term "$S_5$" should read --$S_S$-- and the term "$V_5$" should read --$V_S$--

At col. 6, line 10 the term "$DR_{EN}$" should read --$DR_{GN}$--

At col. 7, line 15 the phrase "$\psi_0$ when" should read "to --when $\psi_0$--

IN THE CLAIMS

In claim 10, line 3 (col. 10, ln. 25) the equation should read as follows:
--$DR_{GE} = \Psi_0 \cdot \Omega \cdot \cos Lt_0$--

Signed and Sealed this

Fifth Day of October, 1999

Attest:

Q. TODD DICKINSON

*Attesting Officer*       *Acting Commissioner of Patents and Trademarks*